Patented Mar. 16, 1948

2,437,842

UNITED STATES PATENT OFFICE 2,437,842

MORTAR AND CEMENT COMPOSITIONS

Frank G. Uhler, Alexandria, Va.

No Drawing. Application March 25, 1946,
Serial No. 657,062

9 Claims. (Cl. 106—90)

This invention relates to inorganic plastic products and processes of preparing same, and it particularly relates to inorganic materials such as cements, mortars, and plasters which are commonly admixed with water prior to shaping products therefrom, and still more particularly to such mortars and plasters containing water soluble addition agents.

In the manufacture of shaped products from Portland cement and hydrated lime and the like, it is common to first admix these materials with water to form an aqueous slurry which can be molded into the desired shape the final article is to take or to prepare aqueous slurries which can be spread on wall surfaces, roadways, between paper liners in making plaster board and the like. The aqueous slurries or suspensions of such materials should have good plastic properties and should spread evenly under the trowel or similar tool used for shaping. The plaster should set quickly and permanently to a high degree of hardness. It has been found that dolomitic limestones which are relatively high in magnesium content are particularly suitable for finishing lime plasters. However, the quality of limes produced from limerock other than those possessing the dolomitic structure may also be improved by the method herein described.

Dolomites are limestones which are composed of equimolecular quantities of calcium and magnesium carbonates with slight variations e. g., 58% $CaCO_3$ and 42% $MgCO_3$. Because of their high purity (freedom from $SiO_2$, etc.) ease of burning and the efficient manner in which they may be hydrated, dolomites possess high commercial value. They are better for plaster finishing than the hydrated high calcium limes because they exhibit higher plasticity and work more smoothly than the hydrated high calcium limes. High calcium limes are better suited for general mortar work because they slake more readily.

In the lime industry "lime rock" is generally referred to as those rocks which contain 80% or more of the carbonate of calcium or the carbonate of magnesium. Lime is regarded as the product which results after the calcination of a lime rock such as the high calcium type or the dolomitic type in which the reactions take place:

$$CaCO_3 + heat \rightarrow CaO + CO_2$$
$$MgCO_3 + heat \rightarrow MgO + CO_2$$

Lime is the mixture of the resulting oxides of calcium and magnesium. In the case of the high calcium limestone where practically no Mg is present, lime may be the single component CaO. Lime and quicklime are synonymous. It is pointed out that CaO and MgO are the active components of lime. It is obvious that $SiO_2$, $Fe_2O_3$, $Al_2O_3$ are also present in all lime rock. Phosphates, sulfates, chlorides are also usually present as impurities. Combination of the lime or quicklime with water in molecular quantities to produce the following reaction:

$$CaO + H_2O \rightarrow Ca(OH)_2$$
$$54 + 18 \rightarrow 72$$

results in a finely powdered dry product known as hydrated lime and it is in this form that the commercial product is usually marketed.

Slaking refers to the process whereby a wet putty-like material is obtained when the hydrated lime of commerce is treated with an excess of water. The amount of water taken up by a calcined sample of limestone on hydrating is practically all accounted for by the hydration of the calcium oxide present. Thus, a hydrated lime from a dolomitic stone consists primarily of calcium hydroxide and a relatively small quantity of magnesium hydroxide. A dolomitic quicklime hydrates much more slowly than a quicklime containing practically all CaO. The reason for this is accounted for by the diluting action of magnesium oxide. This compound influences hydration by bringing every particle of CaO into close contact with the water and by absorbing much of the heat generated. Magnesium oxide is therefore a negative catalyst in the hydrating reaction.

Mixtures of limestone, clay and sand in the proper proportions when heated until the mixture begins to sinter form a "clinker" which when ground to powder form a product called cement. Several varieties are on the market under various names, such as, e. g., Portland cement, hydraulic cement, etc. Such materials when mixed with water will set to a hard stone-like mass and such masses are improved by my invention described hereinafter.

It is well known to the art that the speed of setting and the hardness of set in lime plasters can be positively influenced by the action of carbon dioxide or by soluble metallic sulphates such as manganese sulphate. Mechanical methods are also known whereby limestone is committed to a colloidal state. However, in these methods the improvements are only slight in comparison with the quicksetting and hardness produced by my invention described hereinafter. The prior art materials set too slowly and do not harden enough to be regarded as an outstanding commercial improvement.

The object of this invention is to decrease the "setting" time and increase the ultimate hardness of the lime plaster and cements.

It has been found that plastic properties, quicksetting and hardness of the various lime plasters and cements may be improved by the addition thereto of water soluble alkanol amines.

Typical alkanol amines falling within the generic scope of my invention are mono, di, and tri-ethanolamine, dimethylethanolamine, methyl di-ethanolamine, and triisopropanolamine.

In a practical application of my invention, samples of the lime-rock are prepared for burning by crushing to a size of approximately ½ inch diameter. The crushed material is heated in an oven at a temperature of 1500° to 1900° F. for 7 to 12 hours. After completion of the burning process and immediately after cooling, the burnt quicklime is crushed to 40 mesh size and treated with a definite amount of water to produce hydration of the quicklime with the reaction $CaO + H_2O \rightarrow Ca(OH)_2$. After the hydrating action is completed, the hydrated lime is soaked with water containing a small quantity of triethanolamine to produce a thick paste. After standing for 16–24 hours the lime putty was stirred for several minutes and then tested with an Emley plasticimeter (A. S. T. M. Standards 1927, page 40). Tests with lime plasters containing triethanolamine showed an increase in plasticity values of 30 to 60 as recorded by the Emley plasticimeter. The setting of these lime plasters was observed in the following manner. A paste of normal consistency was molded in a metal ring 1¼ inch in diameter and ¼ of an inch deep. The resulting samples were mounted on glass plates and maintained in moist air during the time required for setting. A belljar containing a small amount of water was used for this purpose. The glass plates holding the mounted samples of lime plaster were placed on a shelf within the belljar. The precaution of setting over water was taken in order to avoid error due to drying action. The actual test for time of setting was made with a Gillmore needle. The Gillmore needle is loaded to weight 1 lb. and is ½ inch thick at the blunt end. The initial set occurs when the needle does not penetrate 5 millimeters beneath the surface of the plaster 30 seconds after releasing. The final set occurs when the needle does not sink visibly into the plaster after contact for an indefinite period of time (1 hour or even longer).

Table I

| Per cent of Hydrated Lime | Per cent of Water | Per cent of Triethanol-amine | Time (Hours) to Set | |
|---|---|---|---|---|
| | | | Initial | Final |
| 56 | 44 | ——— | 12 | 24 |
| 56 | 42 | 2 | 12 | 24 |
| 56 | 41 | 3 | 10 | 20 |
| 56 | 40 | 4 | 10 | 12 |
| 56 | 38 | 6 | 10 | 12 |
| 56 | 36 | 8 | 10 | 12 |
| 56 | 32 | 12 | 8 | 12 |
| 56 | 28 | 16 | 4 | 8 |
| 56 | 24 | 20 | 4 | 8 |
| 56 | 20 | 24 | 6 | 12 |
| 56 | 16 | ¹28 | ——— | ——— |
| 56 | 12 | ¹32 | ——— | ——— |
| 56 | 8 | ¹36 | ——— | ——— |
| 56 | 4 | ¹40 | ——— | ——— |
| 56 | ——— | ¹44 | ——— | ——— |

¹ These compositions do not produce a plastic lime mortar.

The useful limit for addition of the triethanolamine to the lime plasters varies from 5.3% to 42.8% based on the weight of hydrated lime. Plasters containing quantities of triethanolamine added in excess of 42.8% (based on the lime) do not slake properly and the mixture does not form a coherent mass and remains in a granular form. The amount of water is varied in order that the liquid components remain the same and fluidity is unaffected. From the above data it is apparent that triethanolamine in quantities from 5.3% to 42.8% (based on the lime) of the aqueous slurry decreased the setting time of lime plasters. The plasters containing 5.3% to 42.8% (based on the lime) of the triethanolamine also set harder than the control sample in which no triethanolamine was added.

When triethanolamine was added to the lime, it was observed that a heat was evolved which indicated a reaction of the addition agent with one of the constituents of the hydrated lime. The following experimentation indicated that $CaCO_3$ was the active ingredient with triethanolamine in the lime:

Table II

| Per cent of Hydrated Lime | Per cent of Water | Per cent of $CaCO_3$ | Per cent of $MgCO_3$ | Per cent of Triethanol-amine | Time to Final Set |
|---|---|---|---|---|---|
| | | | | | Hours |
| 43 | 47 | 5 | ——— | 5 | 8 |
| 43 | 47 | ——— | 5 | 5 | 16 |

The following table shows the effect of decreasing amounts of triethanolamine when $CaCO_3$ was included in the paste:

Table III

| Per cent of Commercial Lime | Per cent of Water | Per cent of $CaCO_3$ | Per cent of Triethanol-amine | Time (Hours) to Set | |
|---|---|---|---|---|---|
| | | | | Initial | Final |
| 46 | 40 | 4 | 10 | 4 | 6 |
| 46 | 44 | 4 | 6 | 4 | 7 |
| 46 | 48 | 4 | 2 | 2 | 10 |
| 46 | 50 | 4 | ——— | Did not set in damp air | |

It was observed that the final set of the lime plasters was harder, whiter, quicker setting, smoother and more glossy when triethanolamine was used.

The procedure for incorporating triethanolamine may be modified by adding it as part of the aqueous liquid used in the hydration of quick lime to form hydrated lime. The same favorable results are obtainable by this modified procedure.

Although dolomitic hydrated limes were used in developing the data in the examples, it has been found that the high calcium hydrated limes respond in similar manner when influenced by the alkanol amines.

The alkanol amines are also very effective for the quick hard setting of Portland cements as indicated by the following data:

Table IV

| Per cent of Portland Cement | Per cent of Water | Per cent of Triethanola-mine | Time (Hours) to Set | |
|---|---|---|---|---|
| | | | Initial | Final |
| 56 | 44 | ——— | 12 | 24 |
| 56 | 42 | 2 | 12 | 24 |
| 56 | 41 | 3 | 12 | 20 |
| 56 | 40 | 4 | 12 | 18 |
| 56 | 38 | 6 | 8 | 12 |
| 56 | 36 | 8 | 4 | 8 |
| 56 | 32 | 12 | 3 | 8 |
| 56 | 28 | 16 | 3 | 8 |
| 56 | 24 | 20 | 6 | 12 |
| 56 | 20 | ¹24 | ——— | ——— |
| 56 | 16 | ¹28 | ——— | ——— |
| 56 | 12 | ¹32 | ——— | ——— |
| 56 | 8 | ¹36 | ——— | ——— |
| 56 | 4 | ¹40 | ——— | ——— |
| 56 | ——— | ¹44 | ——— | ——— |

¹ These compositions do not "set" properly.

The useful limit for addition of triethanolamine to the Portland cement varies from 5.3% to 35.7% based on the weight of Portland cement. Cements containing more than 20 parts of triethanolamine to 56 parts of Portland cement do not "set" properly.

It has been found that monoethanolamine and diethanolamine are also useful compounds in carrying out my invention, but the effect is more pronounced with the tertiary form (triethanolamine). The triethanolamine is more effective than the diethanolamine, and the diethanolamine is more effective than the monoethanolamine. It has also been found that dimethylethanolamine is comparable to monoethanolamine and methyldiethanolamine is comparable to diethanolamine in carrying out my invention. Triisopropanol amine works similarly to the triethanolamine. Also mixtures of the useful amines may be employed in carrying out my invention.

It is to be understood that no other limitation is to be imposed on my invention except as indicated in the appended claims.

Having described my invention and the manner in which it may be performed, I claim:

1. The process of increasing the hardness and decreasing the time for initial and final "set" of cements and mortars which comprises incorporating water and a water soluble alkanol amine with a composition comprising Portland cement, said water soluble alkanol amine being present in amount between 5.3% and 35.7% based on the weight of Portland cement in said composition, forming a slurry of said composition, shaping said slurry and allowing the composition to "set."

2. The process of increasing the hardness and decreasing the time for initial and final set of cements and mortars which comprises mixing water and a water soluble alkanol amine with a composition comprising hydrated lime, said water soluble alkanol amine being present in amount between 5.3% and 42.8% based on the weight of hydrated lime in said composition, forming a slurry of said composition, shaping said slurry and allowing the composition to "set."

3. A quick setting cement comprising Portland cement, water and a water soluble alkanol amine, said water soluble alkanol amine being present in amount between 5.3% and 35.7% based on the weight of said Portland cement.

4. The product of claim 3 in which the water soluble alkanol amine is selected from the class consisting of monoethanol amine, diethanol amine, triethanol amine, dimethyl ethanol amine, methyl diethanol amine and triisopropanol amine.

5. A quick setting mortar comprising hydrated lime, water and a water soluble alkanol amine, said water soluble alkanol amine being present in amount between 5.3% and 42.8% based on weight of said lime.

6. The product of claim 5 in which the water soluble alkanol amine is selected from the class consisting of monoethanol amine, diethanol amine, triethanol amine, dimethyl ethanol amine, methyl diethanol amine and triisopropanol amine.

7. A new composition of matter comprising a mortar material selected from the class consisting of Portland cement and hydrated lime and a water soluble alkanol amine present in an amount not less than 5.3% based on the weight of the mortar material and not more than 42.8% based on the weight of lime and not more than 35.7% based on the weight of Portland cement.

8. A composition of matter comprising a water soluble alkanol amine, water and a mortar material selected from the class consisting of Portland cement and hydrated lime, said water soluble alkanol amine being present in an amount not less than 5.3% based on the weight of the mortar material and not more than 42.8% based on the weight of lime and not more than 35.7% based on the weight of Portland cement.

9. The process of increasing the hardness and decreasing the time required for the initial and final "set" of cements and mortars which comprises incorporating water and a water soluble alkanol amine with a mortar material selected from the class consisting of Portland cement and lime, said water soluble alkanol amine being present in an amount not less than 5.3% based on the weight of the mortar material and not more than 42.8% based on the weight of lime and not more than 35.7% based on the weight of Portland cement.

FRANK G. UHLER.

REFERENCES CITED

The following references are of record in the file of this patent:

FOREIGN PATENTS

| Number | Country | Date |
|--------|---------|------|
| 470,365 | Great Britain | 1937 |